United States Patent
Yokoyama

(10) Patent No.: US 6,449,018 B1
(45) Date of Patent: Sep. 10, 2002

(54) VIDEO PROCESSING APPARATUS AND VIDEO PROCESSING METHOD

(75) Inventor: Kazuki Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/582,677

(22) PCT Filed: Oct. 29, 1999

(86) PCT No.: PCT/JP99/06007

§ 371 (c)(1),
(2), (4) Date: Sep. 6, 2000

(87) PCT Pub. No.: WO00/27112

PCT Pub. Date: May 11, 2000

(30) Foreign Application Priority Data

Oct. 30, 1998 (JP) ............................................ 10-311307

(51) Int. Cl.⁷ ................................................. H04N 5/45
(52) U.S. Cl. ........................ 348/565; 348/564; 348/565; 348/598; 348/588
(58) Field of Search .................................. 348/565, 564, 348/563, 567, 588, 598, 600; H04N 5/45, 5/445, 9/74, 9/76

(56) References Cited

U.S. PATENT DOCUMENTS

| | | | | |
|---|---|---|---|---|
| 4,845,564 A | * | 7/1989 | Hakamada et al. | 348/565 |
| 5,083,205 A | * | 1/1992 | Arai | 348/565 |
| 5,285,284 A | * | 2/1994 | Takashima et al. | 348/731 |
| 5,287,189 A | * | 2/1994 | Ersoz et al. | 348/588 |
| 5,506,628 A | * | 4/1996 | Chun | 348/565 |
| 5,867,227 A | * | 2/1999 | Yamaguchi | 348/564 |
| 5,978,046 A | * | 11/1999 | Shintani | 348/565 |

FOREIGN PATENT DOCUMENTS

| | | | | |
|---|---|---|---|---|
| JP | 07336620 A | * | 12/1995 | H04N/5/45 |
| JP | 09200642 A | * | 7/1997 | H04N/5/45 |
| JP | 10108093 A | * | 4/1998 | H04N/5/45 |

* cited by examiner

Primary Examiner—John Miller
Assistant Examiner—Trang U. Tran
(74) Attorney, Agent, or Firm—Frommer Lawrence & Haug LLP; William S. Frommer; Joe H. Shallenburger

(57) ABSTRACT

A video processing apparatus includes a selection means (14) for selecting a video signal constituting a main screen and a video signal constituting a sub-screen, a first video processing means (16, 18) for processing the video signal for the main screen selected by the selector, a second video processing means (17, 19) for processing the video signal for the sub-screen selected by the selector, a synthesizing means (20, 21, 22) for setting a video signal obtained when the main screen and the sub-screen are synthesized in one screen by using the video signal processed by the first video processing means and the video signal processed by the second video processing means, and a controller (31) for, when the video signals of the main screen and the sub-screen selected by the selection means are the same video signals, performing control for setting a video signal obtained when the main screen and the sub-screen are synthesized in one screen by using only the video signal processed by the first video processing means the synthesizing means. Operability is improved such that video images obtained by the same video signal can be selected by the main screen and the sub-screen at once, and the difference between the image qualities of both the screens displayed at that time is eliminated.

12 Claims, 3 Drawing Sheets

VIDEO PROCESSING APPARATUS AND VIDEO PROCESSING METHOD

TECHNICAL FIELD

The present invention relates to a video processing apparatus such as a television receiver and, more particularly, to a video processing apparatus and a video processing method for forming a video signal being capable of displaying a main screen and a sub-screen in one screen at once.

BACKGROUND ART

Of conventional television receivers, various television receivers each of which can achieve a two-screen display which allows a main screen and a sub-screen to be displayed at once as a display mode are merchandized. FIGS. 3A to 3C show examples of the two-screen display. As shown in FIG. 3A, a main screen 1a is displayed on the left in a display screen 1, and a sub-screen 1b is displayed on the right to have the same size as that of the main screen. In another example, for example, as shown in FIG. 3B, a main screen 2a is displayed on a left large part of a display screen 2, and a small sub-screen 2b is displayed at the lower right corner. In still another example, for example, as shown in FIG. 3C, a main screen is displayed on a display screen 3 as a full screen, and a small sub-screen 3a may be displayed to partially overlap the main screen. Although the two-screen displays have been described above, some television receiver can achieve a multi-screen display which allows two or more sub-screens (i.e., a total of three or more screens) to be displayed at once.

In the example shown in FIG. 3A, although the main screen 1a and the sub-screen 1b are equal to each other in size, with respect to sound, only an audio signal added to a video signal of the main screen 1a is generally reproduced. However, one of the left and right screens is determined as a main screen depending on a set state at this time.

In this case, in some television receiver which can achieve a recent two-screen display (or a multi-screen display having two or more screens), two tuners for receiving television broadcast signals are prepared such that a main screen and a sub-screen independently perform channel switching operations, one tuner performs reception for the main screen, and the other tuner performs reception for the sub-screen. In this television receiver having the two tuners arranged therein, a user can basically realize a desired arbitrary combination as a main screen and a sub-screen. In a television receiver in which one tuner for receiving signals having the same forms is prepared to achieve a two-screen display, different input video images can be selected on the main screen and the sub-screen. More specifically, for example, a video image obtained by a television broadcast of a ground wave is displayed on the main screen, and a video image of a different system such as a video image obtained by a television broadcast of a satellite broadcast wave or an external input is displayed on the sub-screen.

In a television receiver which achieves the two-screen display described above, even if two tuners are prepared, the video image of the same channel is prohibited from being displayed on the main screen and the sub-screen at once. This is because the image qualities of the main screen and the sub-screen are different from each other.

More specifically, for a tuner or a video signal processing circuit for receiving a signal constituting a main screen, a high-grade circuit component which can display an image having relatively high quality is generally used. However, for a tuner or a video signal processing circuit for receiving a signal constituting a sub-screen, a circuit component for processing an image having an image quality poorer than that of the image of the main screen is used. Therefore, when the same image is displayed on the main screen and the sub-screen, although the image on the main screen is basically the same as that on the sub-screen, the image qualities of these images are different from each other, and unnatural display forms are established. In particular, as shown in FIG. 3A, when a display mode in which the main screen and the sub-screen are equal to each other in size is established, the difference between the image qualities is conspicuous. Especially, in a recent television receiver, a circuit for processing a video signal for a main screen is designed to perform a complex process of improving image quality by a digital process, image qualities are considerably different from each other.

In addition, even if a tuner or a video signal processing circuit for a main screen and a tuner or a video image processing circuit for a sub-screen are constituted by components having the same configurations, the main screen and the sub-screen are generally different from each other in image quality depending on a set state of the respective circuits. It is very difficult to make the image qualities of the images equal to each other. Even if the process for the main screen and the process for the sub-screen have the same configurations, the video image of the same channel is prohibited from being displayed on the main screen and the sub-screen at once.

However, when the video image of the same channel or the same input is prohibited from being displayed on a main screen and a sub-screen, operability viewed from an operator who operates a television receiver is disadvantageously unnatural. More specifically, for example, when a specific channel (e.g., channel number 3) of a television broadcast of a ground wave is displayed on the main screen, and a television broadcast of a ground wave is also displayed on the sub-screen, a channel switching operation of the sub-screen is performed to sequentially switch channel number to 1, 2, . . . , after the image of channel 2 is displayed, the image of channel 3 displayed on the main screen is skipped, and the image of channel 4 is displayed. Therefore, in an ordinary channel switching operation (switching operation when a two-screen display is not established), when a channel switching operation is performed from channel 1 in an ascending order, and a channel-up key is pressed three times, the image of channel 4 is displayed, while in a channel switching operation of the sub-screen, when a channel-up key is pressed three times, the image of channel 5 is displayed on the sub-screen. For this reason, the operability of the channel switching operation when the two-screen display is not established is different from the operability of the channel switching operation when the two-screen display is established, which confuses a user.

Although the problem which is posed when a two-screen display is performed by a television receiver has been described, the same problem as described above is posed in another video device for performing video signal processing for a two-screen display or a multi-screen display. More specifically, for example, in a video tape recording/reproducing device (so-called VTR device), two video signals selected by the device are used to form video signals for performing a two-screen display, and a two-screen display can be performed on a television receiver for image-receiving the video signals output from the device. In this case, for the reason described above, the video signals output from the recording/reproducing device are limited such that the main screen and the sub-screen do not have the same contents.

DISCLOSURE OF THE INVENTION

The present invention has been made in consideration of the problems, and has its object to improve operability when a two-screen display or a multi-screen display having two or more screens is performed.

The first aspect of the present invention provides a video processing apparatus including: selection means for selecting a video signal constituting a main screen from a plurality of video signals and selecting a video signal constituting a sub-screen from the plurality of video signals; first video processing means for processing the video signal for the main screen selected by the selection means; second video processing means for processing the video signal for the sub-screen selected by the selection means; synthesizing means for setting a video signal obtained when the main screen and the sub-screen are synthesized in one screen by using the video signal processed by the first video processing means and the video signal processed by the second video processing means; and control means for, when the video signal for the main screen selected by the selection means and the video signal for the sub-screen selected by the selection means are the same video signals, performing control for setting a video signal obtained when the main screen and the sub-screen are synthesized in one screen by using only the video signal processed by the first video processing means in the synthesizing means.

According to the first aspect, when the main screen and the sub-screen are constituted by the same video signals, the main screen and the sub-screen are constituted by the video signals processed by the same circuit system, and the image qualities of the main screen and the sub-screen are not different from each other. Therefore, video images having the same contents need not be prohibited from being displayed on the main screen and the sub-screen. when an operation such as channel switching or input selection is performed, operability obtained when a two-screen display or a multi-screen display is performed and operability obtained when only an ordinary main screen is displayed can be set to be the same operability, the operability of channel switching or input selection does not change depending on display modes, and preferable operability is assured.

The second aspect of the present invention provides a video processing apparatus, in the first aspect, including display means for image-receiving the video signal synthesized by the synthesizing means.

According to the second aspect, operability in an image receiver which can achieve a two-screen display or a multi-screen display can be improved.

The third aspect of the present invention provides a video processing apparatus, in the first aspect, including a video signal output terminal for outputting the video signal synthesized by the synthesizing means.

According to the third aspect, operability in various video devices such as a video tape recording/reproducing device which can output a video signal which can achieve a two-screen display or a multi-screen display can be improved.

The fourth aspect of the present invention provides a video processing apparatus wherein, in the first aspect, the main screen and the sub-screen obtained by the image signal synthesized by the synthesizing means are screens which are almost equal to each other in size.

According to the fourth aspect, when a video signal which displays the main screen and the sub-screen to have almost equal sizes is set, image qualities obtained when the same video images are displayed can be made equal to each other.

The fifth aspect of the present invention provides a video processing apparatus wherein, in the first aspect, the main screen and the sub-screen obtained by the video signal synthesized by the synthesizing means are designed such that the sub-screen is smaller than the main screen in size.

According to the fifth aspect, when the video signal which displays the main screen and the sub-screen in different sizes is set, image qualities obtained the same video images are displayed can be made equal to each other.

The sixth aspect of the present invention provides a video processing apparatus wherein, in the fifth aspect, the sub-screen is displayed in a region which is a part of the main screen.

According to the sixth aspect, when a video signal which displays the sub-screen by using the region which is the part of the main screen is set, image qualities obtained when the same video images are displayed can be made equal to each other.

The seventh aspect of the present invention provides a video processing method including the steps of: selecting a video signal constituting a main screen from a plurality of video signals and selecting a video signal constituting a sub-screen from the plurality of video signals; setting a video signal obtained when the main screen and the sub-screen are synthesized in one screen after video processing operations are independently performed to the selected video signals, respectively; and, when the video signal for the main screen and the video signal for the sub-screen are the same video signals, setting a video signal obtained when the main screen and the sub-screen are synthesized in one screen by using only the video signal subjected to the video processing operation for the main screen or the video signal subjected to the video processing operation for the sub-screen.

When the processing method according to the seventh aspect is applied, when the main screen and the sub-screen are constituted by the same video signals, the main screen and the sub-screen are constituted by video signals processed by the same circuit system, and the image qualities of the main screen and the sub-screen are not different from each other. Therefore, video images having the same contents need not be prohibited from being displayed on the main screen and the sub-screen. When an operation such as channel switching or input selection is performed, operability obtained when a two-screen display or a multi-screen display is performed and operability obtained when only an ordinary main screen is displayed can be set to be the same operability, the operability of channel switching or input selection does not change depending on display modes, and preferable operability is assured.

The eighth aspect of the present invention provides a video processing method wherein, in the seventh aspect, a video signal obtained when the main screen and the sub-screen are synthesized is displayed.

According to the eighth aspect, operability obtained when a two-screen display or a multi-screen display is performed can be improved.

The ninth aspect of the present invention provides a video processing method, in the seventh aspect, a video signal obtained when the main screen and the sub-screen are synthesized is output.

According to the ninth aspect, operability in an output device when a video signal which can achieve a two-screen display or a multi-screen display is output can be improved.

The tenth aspect of the present invention provides a video processing method wherein, in the seventh aspect, the main screen and the sub-screen which are synthesized are screens which are almost equal to each other in size.

According to the tenth aspect, when the main screen and the sub-screen are displayed to have almost equal sizes, image qualities obtained when the same video images are displayed can be made equal to each other.

The eleventh aspect of the present invention provides a video processing method wherein, in the seventh aspect, the main screen and the sub-screen which are synthesized are designed such that the sub-screen is smaller than the main screen in size.

According to the eleventh aspect, when the main screen and the sub-screen are displayed in different sizes, image qualities obtained the same video images are displayed can be made equal to each other.

The twelfth aspect of the present invention provides a video processing method wherein, in the eleventh aspect, the sub-screen is displayed in a region which is a part of the main screen.

According to the twelfth aspect, when the sub-screen is displayed by using the region which is the part of the main screen, image qualities obtained when the same video images are displayed can be made equal to each other.

BEST MODE FOR CARRYING OUT THE INVENTION

One embodiment of the present invention will be described below with reference to the accompanying drawings.

Figure 1:
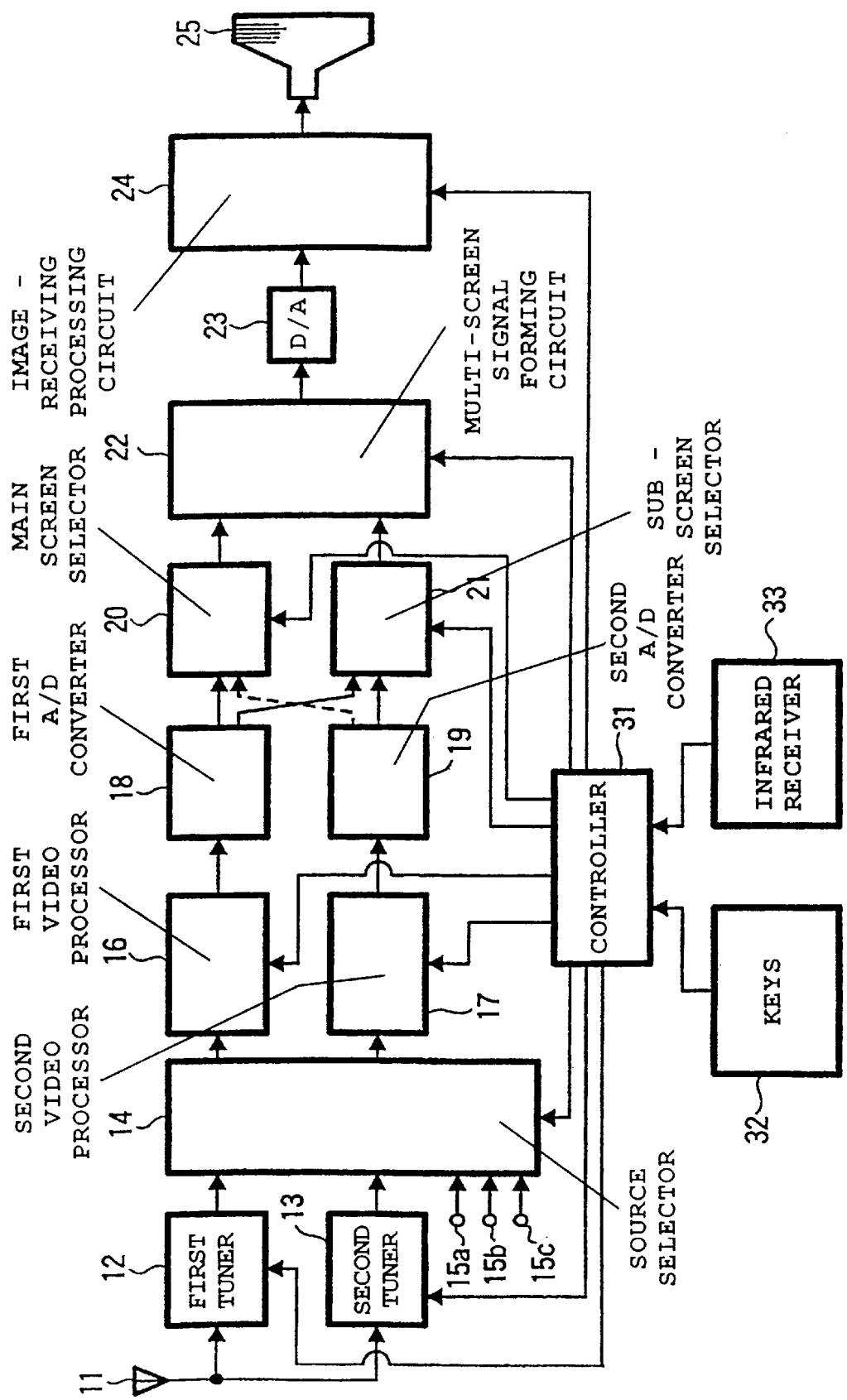
FIG. 1 is a block diagram showing a television receiver according to one embodiment of the present invention.

FIG. 1 is a block diagram showing a configuration according to this embodiment. Here, the present invention is applied to a video processing apparatus formed as a television receiver. In the television receiver shown in FIG. 1, only a processing system for a video signal is illustrated, and a processing system for an audio signal is omitted.

The television receiver of this embodiment is formed as an image receiver which can display at least two screens, i.e., a main screen and a sub-screen at once, and comprises, as tuners for receiving broadcast waves having the same forms, two tuners, i.e., a first tuner 12 and a second tuner 13. More specifically, the first tuner 12 and the second tuner 13 are connected to a common antenna 11, and channels respectively received by the tuners 12 and 13 are controlled by a command output from a controller 31. In this case, the first tuner 12 receives a designated channel when an ordinary display mode (in this case, the ordinary display mode indicates a display mode which is not a two-screen display mode or a multi-screen display mode) is set, and the first tuner 12 receives the channel of the main screen when a two-screen display mode is set. The second tuner 13 is a tuner for performing reception when a two-screen display mode is set, and receives the channel of the sub-screen.

Video signals obtained by the receiving operations in the tuners 12 and 13 are supplied to a source selector 14. In addition to the video signals from the tuners, video signals are supplied from input terminals 15a, 15b, and 15c included in the image receiver to the source selector 14. The source selector 14 selects a signal source (source) of a video image to be displayed under the control of the controller 31. As the source selection process, selection of a video signal for performing a display in the ordinary display mode or a video signal constituting a main screen when the two-screen display mode is set is performed, the selected video signal is supplied to a first video processor 16. In addition, selection of a video signal constituting a sub-screen when the two-screen display mode is set is performed, the selected video signal is supplied to the second video processor 17.

The first video processor 16 and the second video processor 17 are circuits for processing video signals into video signals for image reception. For example, a process of separating a composite video signal supplied from the source selector 14 into a luminance signal Y and color difference signals U and V is performed. In this case, the first video processor 16 is designed to perform video processing having a level higher than that of video processing performed by the second video processor 17. More specifically, for example, in the first video processor 16, a process of separating a luminance signal component from a chroma signal component is performed at a high accuracy, so that the luminance signal Y and the color difference signals U and V are generated. In the second video processor 17, such a digital comb filter is not used (for example, a band-pass filter is used), a process of separating a luminance signal component from a chroma signal component is performed, so that a luminance signal Y and color difference signals U and V are generated. The signal processing states in the first and second video processors 16 and 17 may be adjusted under the control of the controller 31.

The video signals (in this case, the luminance signal Y and the color difference signals U and V) processed by the first video processor 16 are supplied to a first analog/digital converter 18 to be converted into digital video data. The video signals (in this case, the luminance signal Y and the color difference signals U and V) processed by the second video processor 17 are supplied to a second analog/digital converter 19 to be converted into digital video data.

Digital video data converted by the first analog/digital converter 18 is supplied to a multi-screen signal forming circuit 22 through a main screen selector 20. Digital video data converted by the second analog/digital converter 19 is supplied to the multi-screen signal forming circuit 22 through a sub-screen selector 21. Data selected by the main screen selector 20 and the sub-screen selector 21, however, are determined under the control of the controller 31, and reverse data can also be selected by the main screen selector 20 and the sub-screen selector 21. More specifically, by the control of the controller 31, the digital video data converted by the first analog/digital converter 18 can also selected by the sub-screen selector 21, and the digital video data converted by the second analog/digital converter 19 can also be selected by the main screen selector 20.

Figure 3A:
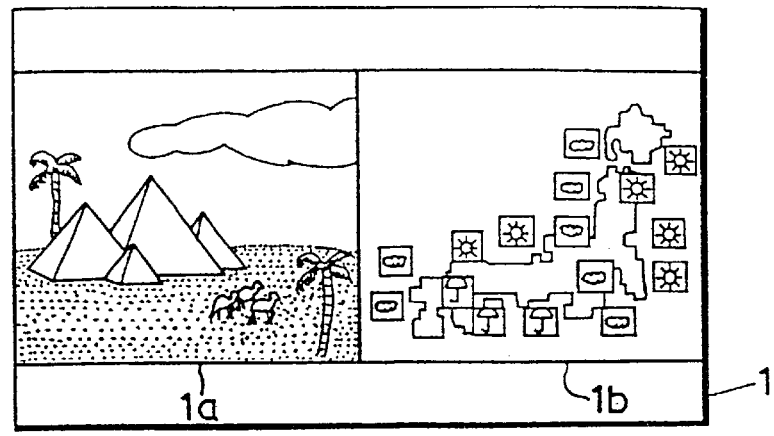
FIGS. 3A to 3C are diagrams for explaining examples of displays in a two-screen display mode.
Figure 3B:
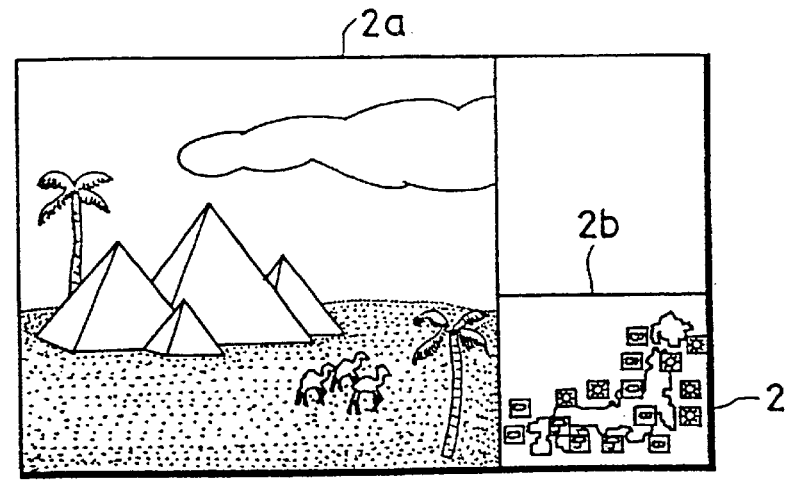
Figure 3C:
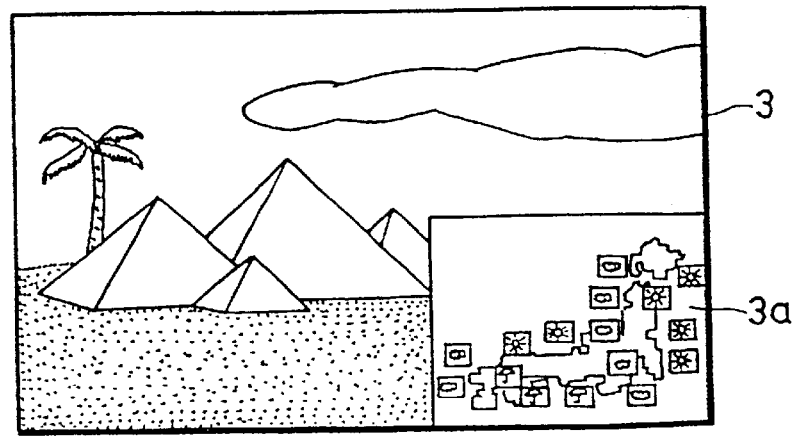

In the multi-screen signal forming circuit 22, when a two-screen display mode is set, the video data supplied from the main screen selector 20 is used as a main screen, and the video data supplied from the sub-screen selector 21 is used as a sub-screen, so that video data for performing a two-screen display in one screen is formed. At this time, the display mode for performing the two-screen display is determined under the control of the controller 31. For example, one of a display mode in which a main screen and a sub-screen are arranged on the left and right in equal sizes as shown in FIG. 3A, a display mode in which a main screen is displayed in a large size and a sub-screen is displayed in a small size as shown in FIG. 3B, a display mode in which a main screen is displayed in an entire screen and a sub-screen is displayed in a small size in the main screen as shown in FIG. 3C, and the like is selected under the control of the controller 31. A multi-screen signal forming process corresponding to this mode is performed. When an ordinary display mode is set, in the multi-screen signal forming circuit 22, a process of directly outputting only the video data supplied from the main screen selector 20 is performed.

The video data output from the multi-screen signal forming circuit 22 is supplied to a digital/analog converter 23 to be an analog video signal. This analog video signal is supplied to an image-receiving processing circuit 24, and an image-reception process for driving a cathode ray tube 25 is performed to display a video image on the tube surface of the cathode ray tube 25.

In the television receiver, operation keys 32 for performing channel switching, input selection, volume control, display mode selection, and the like are arranged. On the basis of the operation of the operation keys 32, the controller 31 controls the respective circuits in corresponding states. In addition, an infrared receiver 33 for receiving a remote control signal transmitted from a remote control device (not shown) as an infrared signal is arranged. The controller 31 is designed such that the controller 31 can control the respective circuits in corresponding states by the remote control signal received by the infrared receiver 33.

Figure 2:
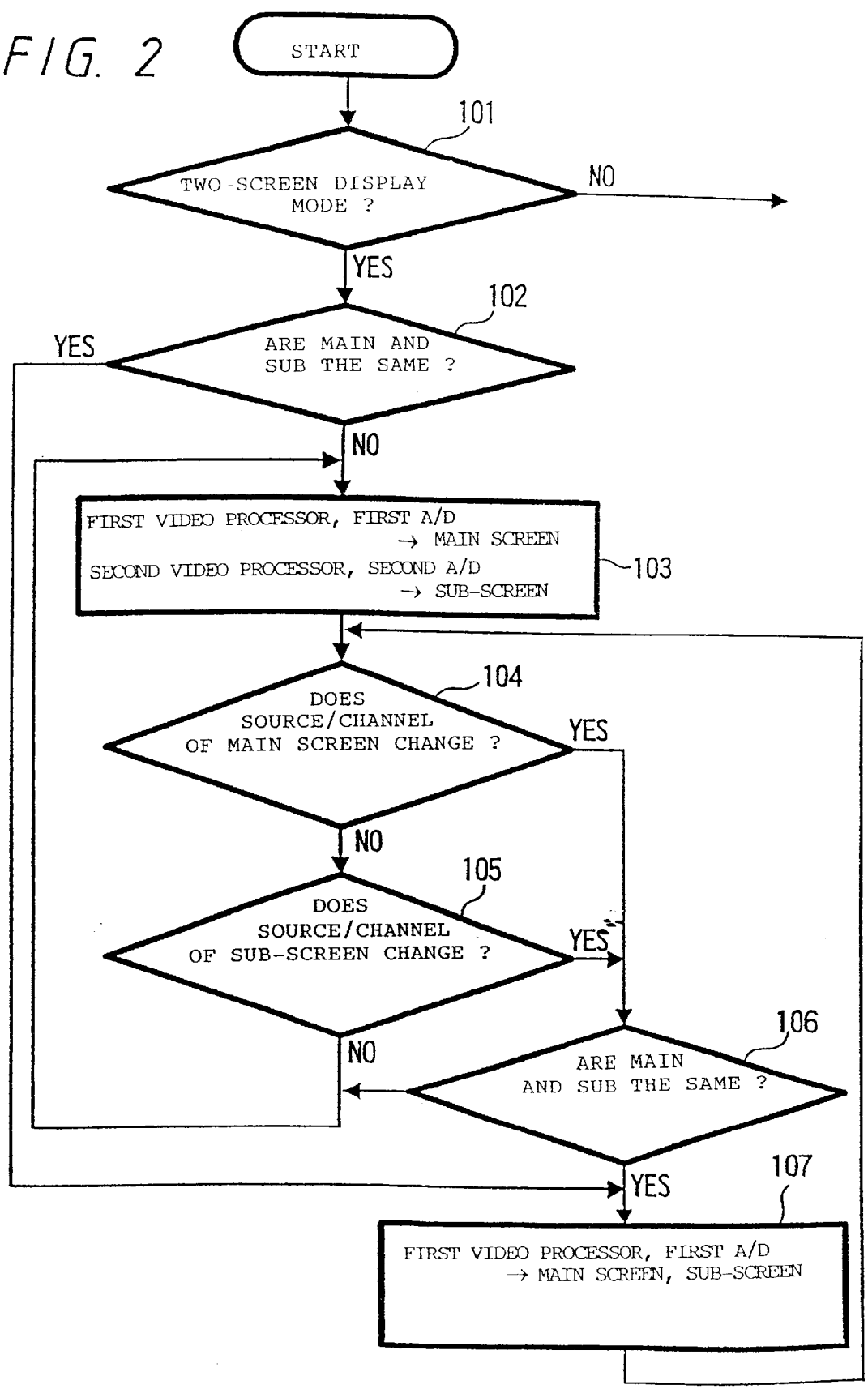
FIG. 2 is a flow chart showing processes in a two-screen display mode according to one embodiment of the present invention.

A display process performed under the control of the controller 31 when a two-screen display is performed by the television receiver of this embodiment will be described below with reference to the flow chart in FIG. 2. The controller 31 checks whether a display mode to be set is a two-screen display mode or not (step 101). In this case, if it is determined that the two-screen display mode is not set, controller 31 is out of the process flow. If it is determined that the two-screen display mode is set, the controller 31 checks whether a source or a channel set in a main screen at this time is equal to a source or a channel set in a sub-screen or not (step 102). The operation for checking whether the sources or channels are equal to each other or not is an operation for checking whether the receiving channel of the main screen is equal to the receiving channel of the sub-screen when output video signals from the tuners 12 and 13 are selected by the main screen and the sub-screen. When video signals supplied from the external input terminals 15a, 15b, and 15b are selected by the main screen and the sub-screen, the operation for checking whether the sources or channels are equal to each other is an operation for checking whether the same input terminal is selected by the main screen and the sub-screen. In a case which does not correspond to these cases, it is determined that the sources or the channels are not equal to each other. An operation for checking whether the sources or channels are equal to each other or not in the following description is performed in the same manner as described above.

If it is determined in step 102 that the sources or the channels are not equal to each other, control is performed such that the video signal processed by the first video processor 16 and output from the first analog/digital converter 18 is selected by the main screen selector 20, and control is also performed such that the video signal processed by the second video processor 17 and output from the second analog/digital converter 19 is selected by the sub-screen selector 21. On the basis of the video signals selected by the selectors 20 and 21, a video signal for performing a multi-screen display in a display manner (i.e., for example, one of the display manners shown in FIGS. 3A, 3B, and 3C) depending on a display mode at this time is formed in the multi-screen signal forming circuit 22. A video image displayed on two screens is displayed on the tube surface of the cathode ray tube 25 (step 103).

After the display process is performed, the controller 31 checks whether an instruction for changing a source or a channel on a main screen by the operation of the operation keys 32 or the remote control signal received by the infrared receiver 33 is established or not (step 104). The controller 31 checks whether an instruction for changing a source or a channel on a sub-screen by the operation of the operation keys 32 or the remote control signal received by the infrared receiver 33 is established or not (step 105).

If the instruction for changing the source or the channel is not established in step 104 or step 105, the display process in step 103 is continued. If the instruction for changing the source or the channel is established in step 104 or step 105, by the change at this time, the controller 31 checks whether the source or the channel of the main screen is equal to the source or the channel of the sub-screen (step 106). It is determined that the source or the channel of the main screen is not equal to the source or the channel of the sub-screen, the display process in step 103 is continued.

If it is determined in step 106 that the source or the channel of the main screen is equal to the source or the channel of the sub-screen, and if it is determined in step 102 that the source or the channel of the main screen is equal to the source or the channel of the sub-screen, control is performed such that the video signal processed by the first video processor 16 and output from the first analog/digital converter 18 is selected by the main screen selector 20 and the sub-screen selector 21. By the video signals selected by the selectors 20 and 21, a video signal for performing a multi-screen display in a display manner (i.e., for example, one of the display manners shown in FIGS. 3A, 3B, and 3C) depending on the display mode at this time is formed in the multi-screen signal forming circuit 22, a video image displayed on two screens is displayed on the tube surface of the cathode ray tube 25 (step 107). Even if the two-screen display process in step 107 is performed, the controller 31 shifts to the checking process for switching of the sources or the channels in steps 104 and 105.

The input selection process in the two-screen display is performed by the selectors 20 and 21, so that a video image displayed as a main screen and a video image displayed as a sub-screen may be video images from the same video signal source. In this case, signals processed by the same circuit system are obtained in signal processing performed immediately before the operations of the main screen selector 20 and the sub-screen selector 21, and the image qualities of the main screen and the sub-screen which are displayed in one screen are equal to each other. When a video image displayed as a main screen is different from a video image displayed as a sub-screen, videos respectively processed by two prepared circuit systems are displayed.

In this manner, when the same video images are displayed on the main screen and the sub-screen, respectively, the difference between the image qualities of both the screens is eliminated so that it becomes unnecessary to regulate the display of the same video images on both a main screen and a sub-screen as a conventional television receiver. For example, when a channel switching operation in an ordinary display mode is performed, and when a channel switching operation of a main screen and a sub-screen in a two-screen display mode, the operabilities of the channel switching operations can be made completely equal to each other. Since a display form in which the same screen is displayed and a display form in which a main screen and a sub-screen are displayed need not be regulated, a control process performed when the controller 31 regulates the main screen and the sub-screen such that the main screen and the sub-screen display the same screen need not be performed. The configuration of an operation program for controlling a two-screen display set in the controller 31 can be simplified.

In the embodiment described above, an output from the first analog/digital converter 18 is always selected by the main screen selector 20, and, on the basis of the state at this time, an output from the first analog/digital converter 18 and an output from the second analog/digital converter 19 are selected by the sub-screen selector 21. However, as indicated by a broken line in FIG. 1 as a connection, an output from the second analog/digital converter 19 may be selected by the main screen selector 20. In particular, in the embodiment described above, the first video processor 16 is designed to be a circuit for performing signal processing having an accuracy higher than that of the second video processor 17. It is assumed that the circuit configuration of the first video processor 16 is absolutely the same as that of the second video processor 17. When the same video images are displayed on the main screen and the sub-screen, if the same output is selected by the two selectors, any output may be selected by the selectors 20 and 21.

In the description up to this, the process for displaying one main screen and a sub-screen at once is described. However, even in a so-called multi-screen display process for displaying one main screen and a plurality of sub-screens at once, when the video image of one of the sub-screens is the same as that of the main screen, the sub-screen of the same video image may be generated by the image signal processed in the same circuit system as that of the main screen. A display manner in which a main screen and a sub-screen are displayed at once may also be a display manner except for the display manners shown in FIGS. 3A, 3B, and 3C.

In the embodiment described above, the process performed when a multi-screen display is performed in a television receiver has been described. However, the present invention can also be applied to the following case. It is a case in which, for example, as in a video tape recording/reproducing device, after a video signal for performing a multi-screen display is formed, the video signal is output from an output terminal to be supplied to another receiver, and a multi-screen display is performed by the receiver. The present invention can also be applied to a case in which a process for a multi-screen display is performed by using a video processing apparatus such as a personal computer apparatus which can perform video signal processing.

What is claimed is:

1. A video processing apparatus comprising:
   selection means for selecting a video signal constituting a main screen from a plurality of video signals and selecting a video signal constituting a sub-screen from the plurality of video signals;
   first video processing means for processing the video signal for the main screen selected by the selection means;
   second video processing means for processing the video signal for the sub-screen selected by the selection means;
   synthesizing means for setting a video signal obtained when the main screen and the sub-screen are synthesized in one screen by using the video signal processed by the first video processing means and the video signal processed by the second video processing means; and
   control means for, when the video signal for the main screen selected by the selection means and the video signal for the sub-screen selected by the selection means are the same video signals, performing control for setting a video signal obtained when the main screen and the sub-screen are synthesized in one screen by using only the video signal processed by the first video processing means in the synthesizing means.

2. A video processing apparatus according to claim 1, comprising display means for image-receiving the video signal synthesized by the synthesizing means.

3. A video processing apparatus according to claim 1, comprising a video signal output terminal for outputting the video signal synthesized by the synthesizing means.

4. A video processing apparatus according to claim 1, wherein the main screen and the sub-screen obtained by the image signal synthesized by the synthesizing means are screens which are almost equal to each other in size.

5. A video processing apparatus according to claim 1, wherein the main screen and the sub-screen obtained by the video signal synthesized by the synthesizing means are designed such that the sub-screen is smaller than the main screen in size.

6. A video processing apparatus according to claim 5, wherein the sub-screen is displayed in a region which is a part of the main screen.

7. A video processing method comprising the steps of:
   selecting a video signal constituting a main screen from a plurality of video signal s and selecting a video signal constituting a sub-screen from the plurality of video signals;
   setting a video signal obtained when the main screen and the sub-screen are synthesized in one screen after video processing operations are independently performed to the selected video signals, respectively; and
   when the video signal for the main screen and the video signal for the sub-screen are the same video signals, setting a video signal obtained when the main screen and the sub-screen are synthesized in one screen by using only the video signal subjected to the video processing operation for the main screen or the video signal subjected to the video processing operation for the sub-screen.

8. A video processing method according to claim 7, wherein a video signal obtained when the main screen and the sub-screen are synthesized is displayed.

9. A video processing method according to claim 7, wherein a video signal obtained when the main screen and the sub-screen are synthesized is output.

10. A video processing method according to claim 7, wherein the main screen and the sub-screen which are synthesized are screens which are almost equal to each other in size.

11. A video processing method according to claim 7, wherein the main screen and the sub-screen which are synthesized are designed such that the sub-screen is smaller than the main screen in size.

12. A video processing method according to claim 11, wherein the sub-screen is displayed in a region which is a part of the main screen.

* * * * *